(12) United States Patent
Hahn et al.

(10) Patent No.: US 6,379,133 B1
(45) Date of Patent: Apr. 30, 2002

(54) SCROLL COMPRESSOR WITH REDUCED STICTION SURFACE FOR CHECK VALVE

(75) Inventors: Gregory W. Hahn, Arkadelphia, AR (US); Todd W. Dewar, Abingdon, VA (US); David M. Fenocchi, Arkadelphia, AR (US); John R. Williams; Tracy L. Milliff, both of Bristol, VA (US)

(73) Assignee: Scroll Technologies, Arkadelphia, AR (US)

( * ) Notice: Subject to any disclaimer, the term of this patent is extended or adjusted under 35 U.S.C. 154(b) by 0 days.

(21) Appl. No.: 09/724,116

(22) Filed: Nov. 28, 2000

(51) Int. Cl.⁷ .......................... F04C 18/04; F04C 29/00; F16K 15/02
(52) U.S. Cl. .................. 418/55.1; 418/270; 137/514
(58) Field of Search .................. 418/55.1, 270; 137/514, 533.17, 533.19

(56) References Cited

U.S. PATENT DOCUMENTS

| | | | | |
|---|---|---|---|---|
| 4,350,179 A | * | 9/1982 | Bunn et al. ................. 137/514 |
| 5,228,468 A | * | 7/1993 | Kapadia ..................... 137/514 |
| 5,494,422 A | | 2/1996 | Ukai et al. ................. 418/55.1 |
| 5,884,665 A | * | 3/1999 | Thurston et al. ............ 137/855 |
| 6,227,830 B1 | * | 5/2001 | Fields et al. ............... 418/55.1 |

* cited by examiner

Primary Examiner—John J. Vrablik
(74) Attorney, Agent, or Firm—Carlson, Gaskey & Olds

(57) ABSTRACT

An improved check valve for a scroll compressor has a stop body which has a contact face which is reduced in surface area to reduce the stiction or holding force holding the valve at shut down. In this way, the valve is allowed to move to its closed position more rapidly.

5 Claims, 1 Drawing Sheet

SCROLL COMPRESSOR WITH REDUCED STICTION SURFACE FOR CHECK VALVE

BACKGROUND OF THE INVENTION

This application relates to a scroll compressor having a check valve that is quicker to react than the prior art valves.

Scroll compressors are utilized in many modem refrigerant compression applications. In a scroll compressor, a pair of scroll members each include a base and a generally spiral wrap extending from the base. One of the two scrolls is caused to orbit relative to the other. The non-orbiting scroll typically has a central discharge port. Refrigerant is entrapped between the wraps, and as the wraps orbit relative to each other compression chambers which trap the refrigerant are reduced in volume. The refrigerant is thus compressed until it reaches the discharge port. At that point, the refrigerant can pass through the discharge port to an outlet port.

A check valve is often positioned near the discharge port. The purpose of the check valve is to reduce the occurrence of reverse rotation. Upon shutdown of the scroll compressor, the orbiting scroll is no longer driven to orbit relative to the non-orbiting scroll. Further, a quantity of refrigerant remains compressed and in a discharge chamber adjacent to port. Without a check valve, this quantity of refrigerant can move back into the compression chambers and drive the orbiting scroll in a reverse direction. This is undesirable.

Scroll compressors have been designed to have a check valve which is intended to close the discharge port and prevent this back flow as soon as possible after shutdown. Thus, the scroll compressors having discharge check valves with passages to communicate a returning fluid to a rear face of the valve are known such that the valve can be driven towards its closed position as quickly as possible. However, it would still be desirable to increase the efficiency and speed with which this check valve moves to the closed position.

SUMMARY OF THE INVENTION

In the disclosed embodiment of this invention, a retainer or stop for the check valve defines an open position. The stop is configured such that a surface, which provides the stop surface for the check valve has reduced surface area. Further, at the same time, the quantity of refrigerant which "sees" the back of the check valve is not increased in volume. This decrease in surface area reduces the stiction or holding force on the check valve. Thus, when the compressor stops, the quantity of refrigerant in the pocket volume drives the check valve to its closed position more quickly.

In further features of this invention, the stiction surface is reduced by a generally cylindrically relief extending around the retainer body. Preferably, this relief does not extend radially outwardly as far as the size of the check valve.

These and other features of the present invention can be best understood from the following specification and drawings, the following of which is a brief description.

DETAILED DESCRIPTION OF A PREFERRED EMBODIMENT

Figure 1:
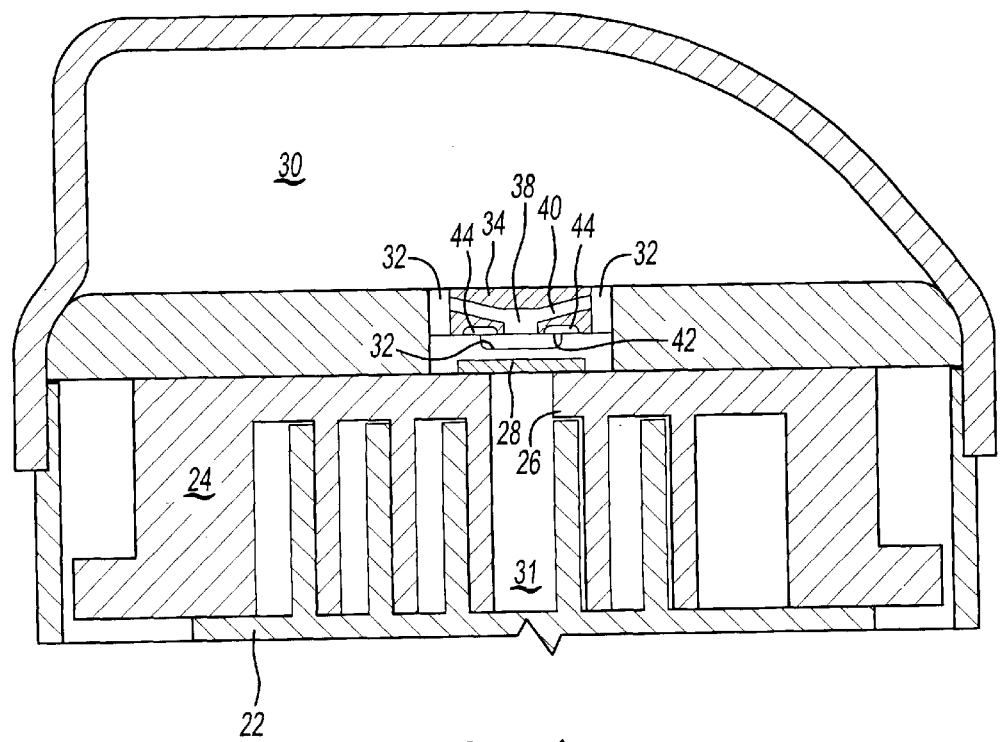
FIG. 1 is a cross-sectional view through a scroll compressor incorporating the present invention.

A scroll compressor 20 is illustrated in FIG. 1 having an orbiting scroll 22 and a non-orbiting scroll 24. As known, orbiting scroll 22 is driven to orbit relative to the non-orbiting scroll 24. A discharge port 26 extends through a base of the non-orbiting scroll 24. A check valve 28 is intended to close the port 26 and prevent the backflow of compressed refrigerant from a chamber 30 through the discharge port 26 and back into compression chambers 31 defined between the non-orbiting scroll 24 and the orbiting scroll 22.

Figure 2:
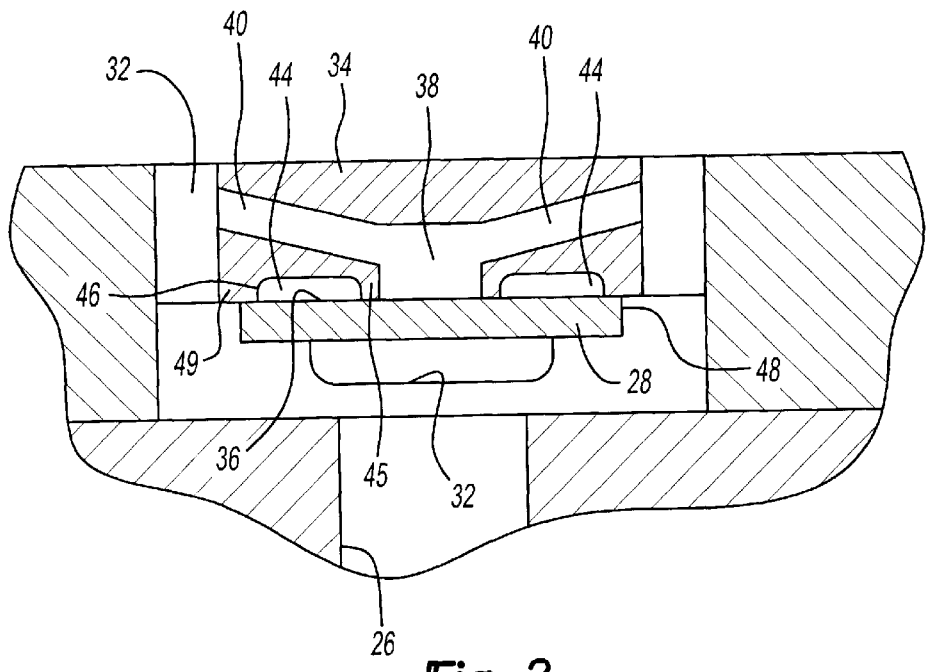
FIG. 2 is a cross-sectional partial view of the inventive check valve structure.

As further shown, discharge passages 32 are formed radially outwardly and spaced circumferentially about a retainer or stop body 34. As shown in FIG. 2, when the orbiting scroll 22 is driven to orbit, the compressed refrigerant leaving port 26 drives the check valve to a position at which it rests against the stop body 34. A pocket volume 38 communicates with return passages 40 to provide a force against the rear face 36 of the check valve 28. When the compressor is stopped, this force will drive the check valve 28 back to the closed position such as shown in FIG. 1. This application preferably utilizes a valve and valve stop body similar to that disclosed in co-pending patent application 09/478184 entitled "Check Valve Stop and Ports" U.S. Pat. No. 6,224,356. The main goal of this invention is to increase the speed of the movement between the open FIG. 2 position 36, and the closed position 28 as shown in FIG. 1.

The stop surface 42 is shown to have relief 44 cut into the face to provide a reduction in the surface contact area of the face 42. As shown, there is radially inner surface area 45 which is in contact with the check valve 28 and separates recess 44 from pocket 38. The relief also has a radially outer portion 46 which does not extend radially outwardly as far as the radially outermost portion 48 of the check valve 28. Nor does portion 46 extend to the radially outermost portion of the stop body 34. Instead, as shown, the stop body 34 has a radially outer portion 49 outwardly of portion 46.

In the position shown in FIG. 2, when the check valve is in the position 36, the recess 44 reduces the surface contact area between the check valve 28 and the face 42. Now, when the compressor is stopped, the returning refrigerant will enter the pocket 38 and drive the valve 28 downwardly towards the port 26. The reduction of the surface area will decrease the response time of the check valve leaving the stop body. At the same time, since there is portion 45 and portion 49, the recess 44 is essentially isolated from the compressed refrigerant. Thus, there is no increase in shutdown time such as could be encountered if the pocket volume of pocket 38 were increased.

A preferred embodiment of this invention has been disclosed, however, a worker in this art would recognize that certain modifications would come within the scope of this invention. For that reason, the following claims should be studied to determine the true scope and content of this invention.

While the passages 40 are shown extending at a small angle, they could also extend horizontally.

We claim:

1. A scroll compressor comprising:
   a first scroll member having a wrap and a generally spiral wrap extending from said wrap;
   a second scroll member having a base and a generally spiral wrap extending from said base, said wraps of said first and second scroll members interfitting to define compression chambers, and said second scroll member being caused to orbit relative to said first scroll member;
   a discharge port formed through said base of said first scroll member; and a check valve assembly positioned above said discharge port, said check valve assembly including a valve plate movable between a closed position at which it closes said discharge port and an open position at which it allows refrigerant to flow from said compression chambers through said discharge port to a discharge chamber, a valve stop body being positioned spaced from said discharge port and providing a stop for said valve plate when in said open position, and a recess formed in said contact face of said stop body, said recess being isolated from said discharge pressure refrigerant, and said recess reducing the contact area between said stop body and said valve plate, said valve stop body including a pocket volume in a contact face which contacts said valve plate, said pocket volume communicating with discharge pressure refrigerant through passages, and said recess being isolated from said pocket volume.

2. A scroll compressor as recited in claim 1, wherein said recess is a generally cylindrical recess extending into said contact face.

3. A scroll compressor as recited in claim 1, wherein said recess is spaced radially outward of said pocket volume, with a portion of said contact face positioned radially between said recess and said pocket volume.

4. A scroll compressor as recited in claim 3, wherein discharge passages pass along said stop body radially outward of said pocket volume, and said recess being spaced radially inwardly of said discharge passages, such that there is a portion of said contact face radially between said recess and said discharge passages.

5. A scroll compressor as recited in claim 4, wherein said valve plate has a radially outer portion which is spaced radially outwardly of a radially outermost portion of said recess.

* * * * *